US007853952B2

(12) United States Patent
Riddle

(10) Patent No.: US 7,853,952 B2
(45) Date of Patent: *Dec. 14, 2010

(54) DYNAMIC PARTITIONING OF NETWORK RESOURCES

(75) Inventor: Guy Riddle, Los Gatos, CA (US)

(73) Assignee: Packeteer, Inc., Cupertino, CA (US)

( * ) Notice: Subject to any disclaimer, the term of this patent is extended or adjusted under 35 U.S.C. 154(b) by 194 days.

This patent is subject to a terminal disclaimer.

(21) Appl. No.: 12/180,661

(22) Filed: Jul. 28, 2008

(65) Prior Publication Data

US 2009/0019162 A1 Jan. 15, 2009

Related U.S. Application Data

(63) Continuation of application No. 09/966,538, filed on Sep. 26, 2001, now Pat. No. 7,406,522.

(51) Int. Cl.
*G06F 9/46* (2006.01)
*G06F 15/173* (2006.01)

(52) U.S. Cl. ...................... 718/104; 709/226

(58) Field of Classification Search ................. 718/104; 709/226

See application file for complete search history.

(56) References Cited

U.S. PATENT DOCUMENTS

| | | | |
|---|---|---|---|
| 5,802,106 A | 9/1998 | Packer | |
| 6,011,776 A | 1/2000 | Berthaud et al. | |
| 6,018,516 A | 1/2000 | Packer | |
| 6,038,216 A | 3/2000 | Packer | |
| 6,115,357 A | 9/2000 | Packer et al. | |
| 6,128,713 A | 10/2000 | Eisler et al. | |
| 6,154,776 A | 11/2000 | Martin | |
| 6,195,362 B1 | 2/2001 | Darcie et al. | |
| 6,205,120 B1 | 3/2001 | Packer et al. | |
| 6,262,976 B1 * | 7/2001 | McNamara | 370/254 |
| 6,285,658 B1 | 9/2001 | Packer | |
| 6,366,945 B1 | 4/2002 | Fong et al. | |
| 6,412,000 B1 | 6/2002 | Riddle et al. | |
| 6,490,249 B1 | 12/2002 | Aboul-Magad et al. | |
| 6,546,415 B1 | 4/2003 | Park | |
| 6,771,661 B1 | 8/2004 | Chawla et al. | |
| 6,934,745 B2 | 8/2005 | Krautkremer | |
| 6,952,735 B1 | 10/2005 | Aune | |
| 6,968,323 B1 | 11/2005 | Bansal et al. | |
| 6,970,432 B1 * | 11/2005 | Hankins et al. | 370/254 |
| 2002/0194326 A1 | 12/2002 | Gold et al. | |

OTHER PUBLICATIONS

Packeteer, Inc. PacketShaper™, Reference Guide, Version 3.1, Jun. 1998.

Packeteer, Inc. PacketShaper™, Version 4.0, Release Notes, Mar. 1999.

(Continued)

*Primary Examiner*—Qing Wu
(74) *Attorney, Agent, or Firm*—Baker Botts L.L.P.

(57) ABSTRACT

Methods and apparatuses allowing for dynamic partitioning of a network resource among a plurality of users. In one embodiment, the invention involves recognizing new users of a network resource; creating user partitions on demand for new users, wherein the user partition is operable to allocate a portion of a network resource; and, reclaiming inactive user partitions for subsequent new users.

23 Claims, 10 Drawing Sheets

OTHER PUBLICATIONS

Packeteer, Inc. PacketShaper™, Reference Guide, Version 4.0, Mar. 1999.
Packeteer, Inc. PacketShaper™ 4000, Getting Started Guide, Version 4.0, Mar. 1999.
Packeteer, Inc. PacketShaper™ 2000, Getting Started Guide, Version 4.0, Mar. 1999.
Packeteer, Inc. PacketShaper™ 1000, Getting Started Guide, Version 4.0, Mar. 1999.
Packeteer, Inc. PacketShaper®, Reference Guide, Version 4.1, Mar. 2000.
Packeteer, Inc. PacketShaper®, Version 4.1, Release Notes, Feb. 2000, Mar. 2000.
Packeteer, Inc. PacketShaper® 4000/ISP, Version 4.1, Release Notes, Mar. 2000.
Packeteer, Inc. PacketShaper® 4000, Getting Started Guide, Version 4.1, Mar. 2000.
Packeteer, Inc. PacketShaper® 2000, Getting Started Guide, Version 4.1, Mar. 2000.
Packeteer, Inc. PacketShaper® 1000, Getting Started Guide, Version 4.1, Mar. 2000.
Packeteer, Inc. PacketShaper® Release Notes, Version 4.1, Mar. 2000.
Packeteer, Inc. PacketShaper® 4000/ISP, Version 4.1.0-4.1.2; Packeteer, Inc.; PacketShaper® 4500/ISP, Version 4.12, Release Notes, Apr. 2000.
Packeteer, Inc. PacketShaper®, Release Notes, Version 4.1, Feb. 2000.
Packeteer, Inc. PacketShaper®, Version 5.0.0 Release Notes, Oct. 2000.
Packeteer, Inc. PacketShaper®, Reference Guide, Version 5.0, Aug. 2000.
Packeteer, Inc. PacketShaper®, Getting Started Guide, Version 5.0, Nov. 2000.
Packeteer, Inc. PacketShaper®, PacketWise™, Version 5.0.2, Release Notes, Dec. 2000.
Packeteer, Inc. PacketWise™, Release Notes, Version 5.0.5, Mar. 2001.
Packeteer, Inc. PacketShaper®, PacketWise™, Version 5.0.6, Release Notes, Mar. 2001.
Packeteer, Inc. PacketShaper®, PacketWise™, Version 5.1, Release Notes, May 2001.
Packeteer, Inc. PacketShaper®, PacketWise™, Version 5.1, Reference Guide, May 2001.
Packeteer, Inc. PacketShaper®, PacketWise™, Version 5.1, Getting Started Guide, May 2001.
Packeteer, Inc. PacketShaper®, PacketWise™, Version 5.1.1, Release Notes, Jul. 2001.
Packeteer, Inc. PacketShaper®, PacketWise™, Version 5.1.2, Release Notes, Oct. 2001.
Packeteer, PacketShaper® Reference Guide, Versions 3.1-5.1.

* cited by examiner

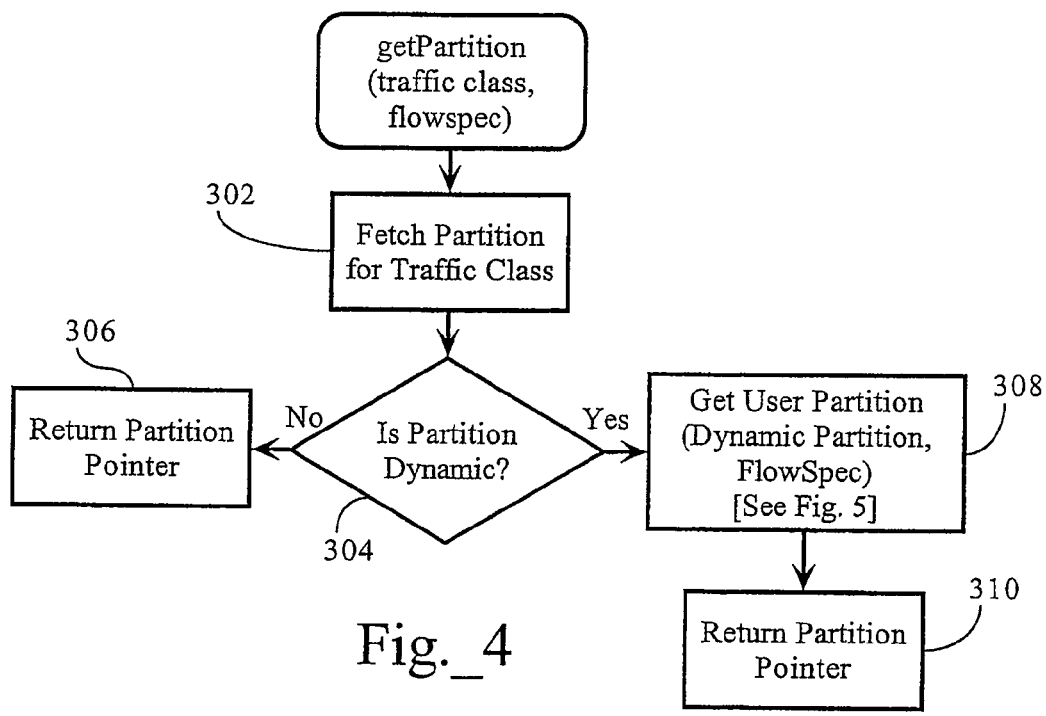
Fig._4
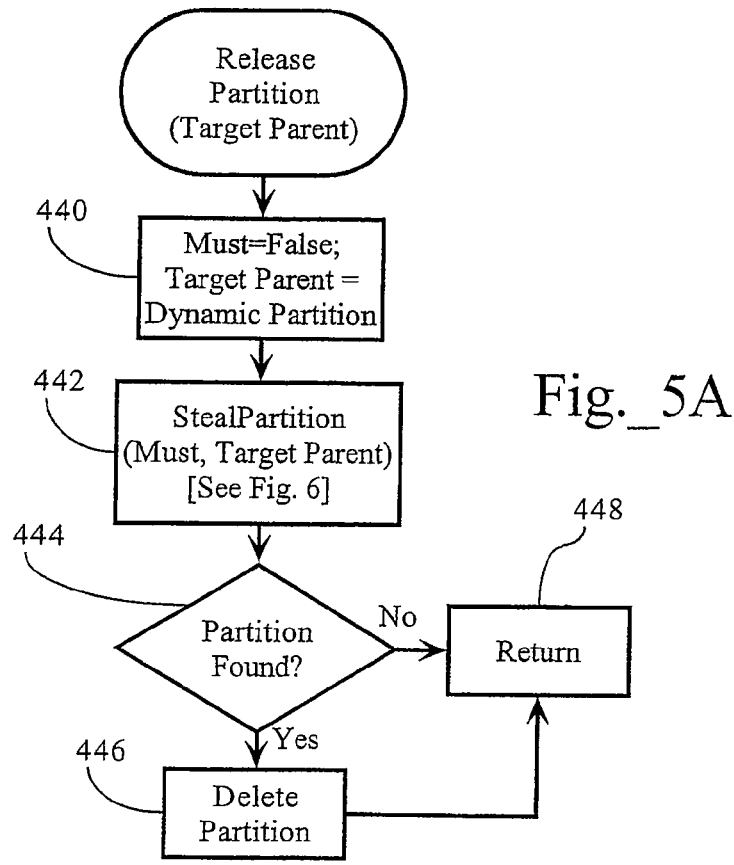
Fig._5A

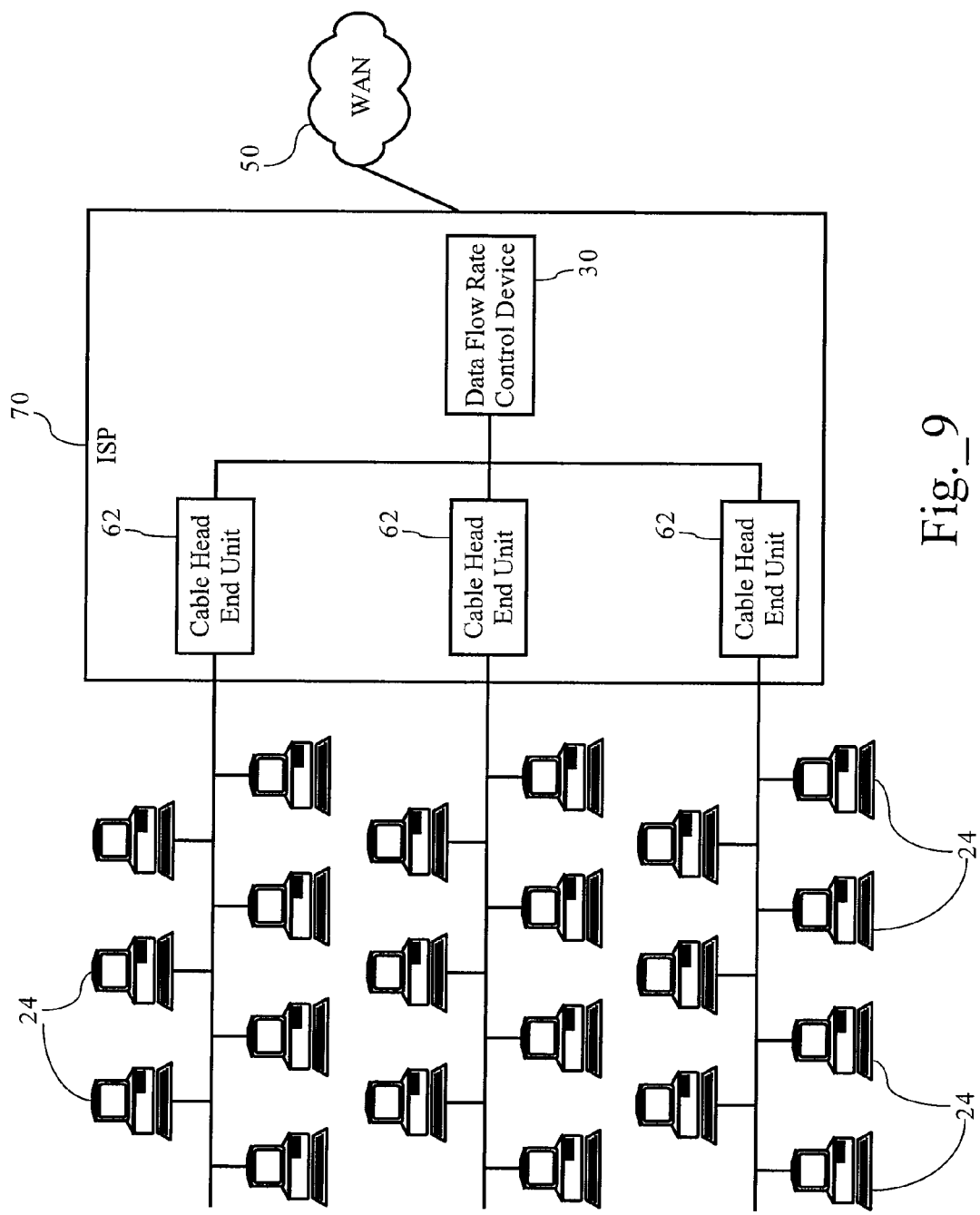
Fig._9

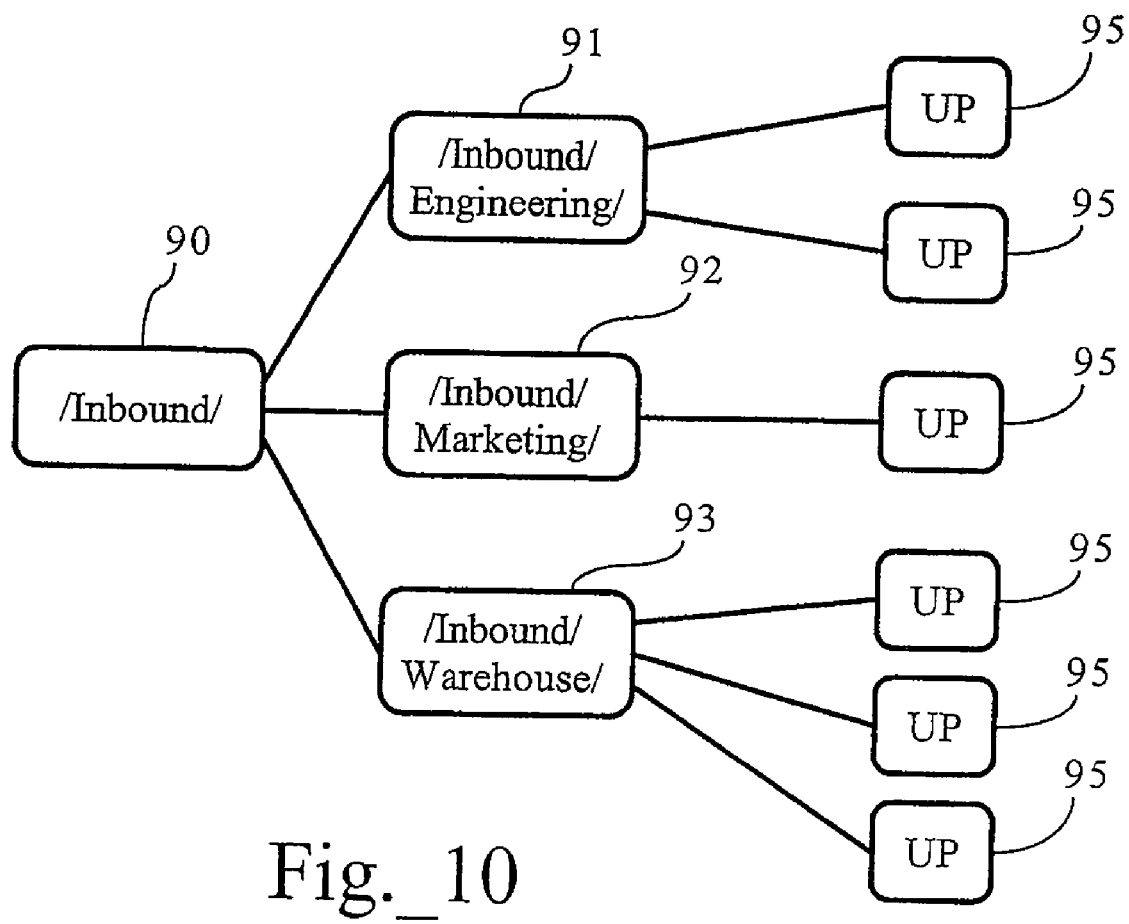
Fig._10

DYNAMIC PARTITIONING OF NETWORK RESOURCES

RELATED APPLICATIONS

This application is a continuation of U.S. patent application Ser. No. 09/966,538 filed Sep. 26, 2001 entitled "DYNAMIC PARTITIONING OF NETWORK RESOURCES," now U.S. Pat. No. 7,406,522.

CROSS-REFERENCE TO RELATED APPLICATIONS

This application makes reference to the following commonly owned U.S. patent applications and patents, which are incorporated herein by reference in their entirety for all purposes:

U.S. patent application Ser. No. 08/762,828, now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment Without a Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;" and U.S. patent application Ser. No. 09/198,090 now U.S. Pat. No. 6,412,000, in the name of Guy Riddle and Robert L. Packer, entitled "Method for Automatically Classifying Traffic in a Packet Communications Network."

FIELD OF THE INVENTION

The present invention relates to shared or network resources and, more particularly, to methods and systems allowing for the dynamic allocation of access to network resources among a plurality of users.

BACKGROUND OF THE INVENTION

Efficient allocation of network resources, such as available network bandwidth, has become critical as enterprises increase reliance on distributed computing environments and wide area computer networks. The widely-used TCP/IP protocol suite, which implements the world-wide data communications network environment called the Internet and is employed in many local area networks, intentionally omits any explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily.

In order to understand the context of certain embodiments of the invention, the following provides an explanation of certain technical aspects of a packet based telecommunications network environment. Internet/Intranet technology is based largely on the TCP/IP protocol suite, where IP (Internet Protocol) is the Open Systems Interconnection (OSI) model network layer protocol and TCP (Transmission Control Protocol) is the OSI transport layer protocol. At the network level, IP provides a "datagram" delivery service—that is, IP is a protocol allowing for delivery of a datagram or packet between two hosts. By contrast, TCP provides a transport level service on top of the datagram service allowing for guaranteed delivery of a byte stream between two IP hosts. In other words, TCP is responsible for ensuring at the transmitting host that message data is divided into packets to be sent, and for reassembling, at the receiving host, the packets back into the complete message.

TCP has "flow control" mechanisms operative at the end stations only to limit the rate at which a TCP endpoint will emit data, but it does not employ explicit data rate control. The basic flow control mechanism is a "sliding window", a time slot within an allowable window which by its sliding operation essentially limits the amount of unacknowledged transmit data that a transmitter can emit. Another flow control mechanism is a congestion window, which is a refinement of the sliding window scheme involving a conservative expansion to make use of the full, allowable window. A component of this mechanism is sometimes referred to as "slow start."

The sliding window flow control mechanism works in conjunction with the Retransmit Timeout Mechanism (RTO), which is a timeout to prompt a retransmission of unacknowledged data. The timeout length is based on a running average of the Round Trip Time (RTT) for acknowledgment receipt, i.e. if an acknowledgment is not received within (typically) the smoothed RTT+4*mean deviation, then packet loss is inferred and the data pending acknowledgment is re-transmitted. Data rate flow control mechanisms which are operative end-to-end without explicit data rate control draw a strong inference of congestion from packet loss (inferred, typically, by RTO). TCP end systems, for example, will "back-off,"—i.e., inhibit transmission in increasing multiples of the base RTT average as a reaction to consecutive packet loss.

A crude form of bandwidth management in TCP/IP networks (that is, policies operable to allocate available bandwidth from a single logical link to network flows) is accomplished by a combination of TCP end systems and routers which queue packets and discard packets when some congestion threshold is exceeded. The discarded and therefore unacknowledged packet serves as a feedback mechanism to the TCP transmitter. Routers support various queuing options to provide for some level of bandwidth management. These options generally provide a rough ability to partition and prioritize separate classes of traffic. However, configuring these queuing options with any precision or without side effects is in fact very difficult, and in some cases, not possible.

Seemingly simple things, such as the length of the queue, have a profound effect on traffic characteristics. Discarding packets as a feedback mechanism to TCP end systems may cause large, uneven delays perceptible to interactive users. Moreover, routers can only control outbound traffic. A 5% load or less on outbound traffic can correspond to a 100% load on inbound traffic, due to the typical imbalance between an outbound stream of acknowledgments and an inbound stream of data.

In response, certain data flow rate control mechanisms have been developed to provide a means to control and optimize efficiency of data transfer as well as allocate available bandwidth among a variety of business functionality. For example, U.S. Pat. No. 6,038,216 discloses a method for explicit data rate control in a packet-based network environment without data rate supervision. Bandwidth management devices allow for explicit data rate control for flows associated with a particular traffic classification. In addition, certain bandwidth management devices allow network administrators to divide available bandwidth into partitions. These partitions ensure a minimum bandwidth and/or cap bandwidth as to a particular class of traffic. An administrator specifies a traffic class (such as FTP data, or data flows involving a specific user) and the size of the reserved virtual link—i.e., minimum guaranteed bandwidth and/or maximum bandwidth. Such partitions can be applied on a per-application basis (protecting and/or capping bandwidth for all traffic associated with an application) or a per-user basis (protecting and/or capping bandwidth for a particular).

While they operate effectively for their intended purposes, such static partitions, however, have certain limitations. When multiple users use a shared resource such as a cable modem connection or a single file server, TCP/IP does not ensure that an adequate share of the network resource is provided to each user. In order to provide a desired quality service to active users, a mechanism is necessary to make sure a single user does not dominate the shared resource. For example, the disparities in user access speeds among users of a network resource may result in a situation where users having high-speed access (e.g., DSL or cable modem access) "hog" available bandwidth associated with a network resource and, thus, crowd out users with low speed access (e.g., modem users). In addition, it may be desirable to limit the total number of active users that may access the shared resource at any point in time so that sufficient bandwidth exists to provide a satisfactory experience to each user.

Static partitions, discussed above, can be used to achieve these objectives. However, this mechanism requires an administrator to identify each potential user and configure a static partition for each. This mechanism becomes unwieldy, if not impossible to implement, given a large and/or unknown pool of potential users. For example, a network administrator would have to constantly update a static partition configuration as new users sign up for or drop a network resource. Moreover, each static partition requires memory space for the data structure that defines the partition and includes other required parameters, thus limiting the number of static partitions that can be created in any single bandwidth management device. In addition, while static partitions can limit the size of an allocation of the network resource to individual users, they do not limit the total number of users, which also affects response time or other quality of experience characteristics. Still further, static partitions are inefficient where the pool of potential users is generally much larger than the number of users actually using a network resource at a given time.

In light of the foregoing, a need exists in the art for a mechanism that recognizes new users and dynamically allocates to each user a partition controlling access to a network resource. In addition, a need in the art exists for a mechanism that allows for capping the number of concurrent users of a network resource. Embodiments of the present invention substantially fulfill these needs.

SUMMARY OF THE INVENTION

The present invention provides methods and apparatuses allowing for dynamic partitioning of a network resource among a plurality of users. In one embodiment, the invention involves recognizing new users of a network resource; creating user partitions on demand for the new users, wherein each user partition is operable to control utilization a network resource; and, reclaiming inactive user partitions for subsequent new users.

DESCRIPTION OF THE DRAWINGS

FIG. 4 is a flow chart setting forth a method that returns a partition corresponding to a data flow.

FIG. 5A is a flow chart illustrating a method associated with processing requests for user partitions.

FIG. 9 is a functional block diagram illustrating an embodiment of the present invention applied to a system involving a plurality of subscribers using cable modems to access computer network services.

FIG. 10 is a block diagram setting forth an illustrative partition configuration.

DESCRIPTION OF PREFERRED EMBODIMENT(S)

Figure 1:
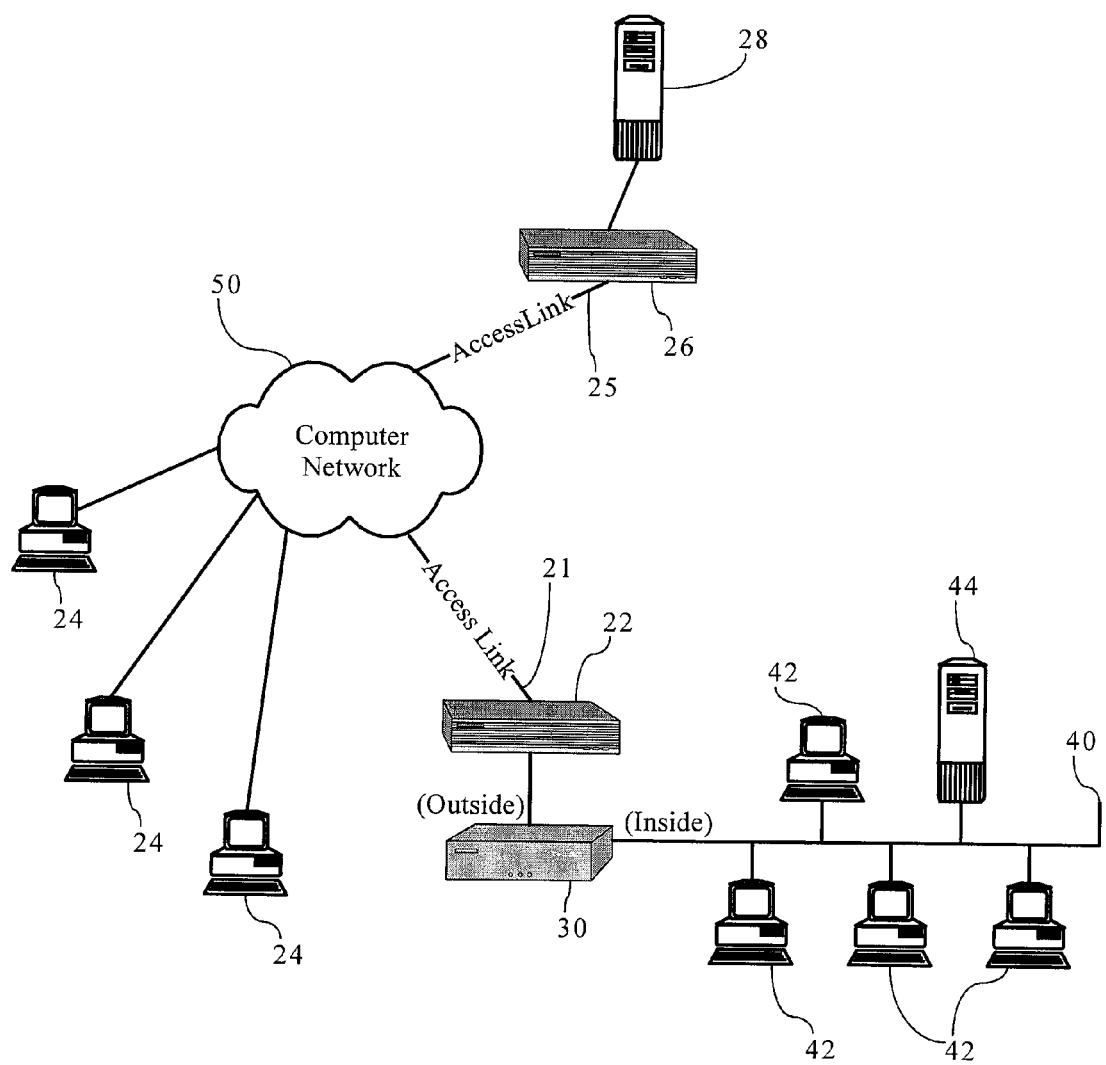
FIG. 1 is a functional block diagram illustrating a computer network environment including a data flow rate control device.

FIG. 1 sets forth a packet-based computer network environment including a data flow rate control device 30. As FIG. 1 shows, local area computer network 40 interconnects several TCP/IP end systems, including client devices 42 and server device 44, and provides access to resources operably connected to computer network 50 via router 22 and access link 21. Server 28 is a TCP end system connected to computer network 50 through router 26 and access link 25. Client devices 24 are additional TCP end systems operably connected to computer network 50 by any suitable means, such as through an Internet Services Provider (ISP). The computer network environment, including computer network 50 is a packet-based communications environment, employing TCP/IP protocols and has a plurality of interconnected digital packet transmission stations. Data flow rate control device 30 is provided between router 22 and local area computer network 40. Data flow rate control device 30 is operative to classify data flows and, depending on the classification, enforce respective partitions on the data flows to control and allocate bandwidth utilization across access link 21.

A. Data Flow Rate Control Device

Figure 2:
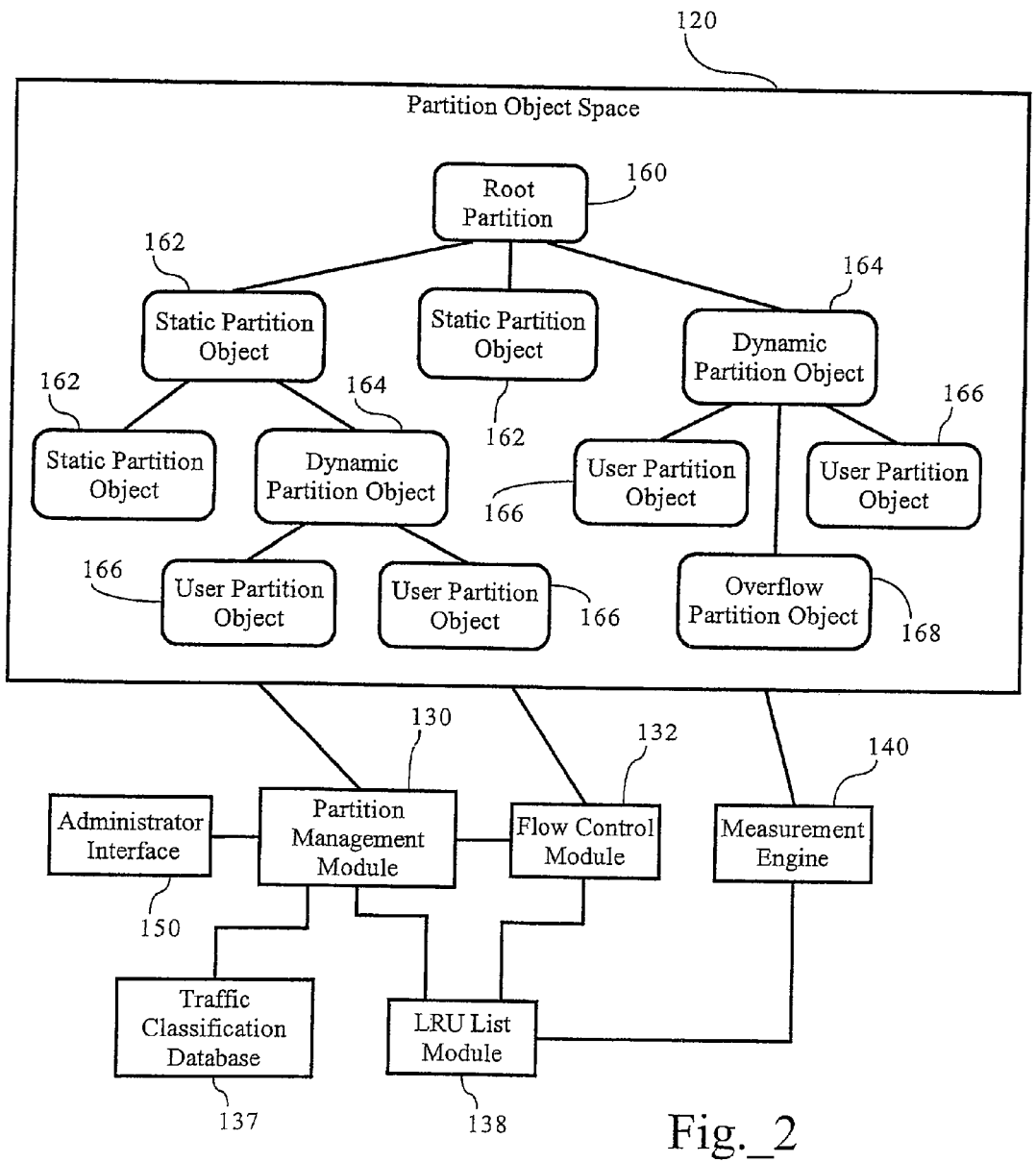
FIG. 2 is a functional block diagram setting forth the functionality in a data flow rate control device and including a representation of a partition object space.

FIG. 2 is a block diagram illustrating the functionality of data flow rate control device 30. In one embodiment, data flow rate control device 30 comprises partition management module 130, flow control module 132, measurement engine 140, administrator interface 150, partition object space 120, traffic classification database 137, and LRU List module 138. Partition management module 130 is operable to create and manage partition objects defining various partitions in partition object space 120 as more fully described below. Flow control module 132 is operative to enforce partitions on data flows traversing data flow rate control device 30. Flow control module 132 can use any suitable functionality to enforce partitions known in the art, including, but not limited to class-based weighted fair queuing, Committed Access Rate (CAR) and "leaky bucket" techniques. Flow control module 132 may incorporate any or a subset of the functionality described in the cross-referenced U.S. patents set forth above for controlling the rate of data flows. LRU list module 138 maintains two Least Recently Used (LRU) lists, namely, an active flow LRU list and a departed user LRU list, as more fully described below. Partition object space 120 stores a plurality of partition objects, including static partition objects 162, dynamic partition objects 164, user partition objects 166 and overflow partition objects 168. Traffic classification database 137 stores traffic classifications in association with pointers to static or dynamic partition objects, if applicable. Measurement engine 140 monitors operation of data flow rate control device 30 and periodically samples and logs usage data, such as the number of data packets traversing in or out, the number of live users, as well as data relating to the use of static and dynamic partitions.

Administrator interface 150 facilitates the configuration of data flow rate control device 30 and allows access to report data detailing the operation of data flow rate control device 30. Administrator interface 150 allows administrators to configure static and dynamic partitions, as more fully described below, as well as other data flow rate control and bandwidth management functions unrelated to the present invention. Administrator interface 150 can be a command line interface or a graphical user interface accessible, for example, through a conventional browser on client device 42.

A.1. Traffic Classification Database

A traffic class is a logical grouping of data flows that share the same characteristic or set of characteristics—e.g., a specific application, protocol, IP address, MAC address, port, etc. In one embodiment, each traffic class has at least one matching rule defining the criteria used for identifying a specific traffic type. Data flow rate control device 30, in one embodiment, monitors network traffic passing through access link 21 and applies matching rules to identify a traffic class associated with each data flow. In one embodiment, data flow rate control device 30 includes functionality allowing for classification of network traffic based on information from layers 2 to 7 of the OSI reference model. Data flow rate control device 30 allows an administrator to manually create a traffic class by specifying a set of matching rules and also automatically creates traffic classes by monitoring network traffic across access link 21 and classifying data flows according to a unique set of matching rules for each traffic class. Automatic traffic classification is disclosed in application Ser. No. 09/198,090, now U.S. Pat. No. 6,412,000, which is incorporated herein by reference.

Traffic classification database 137 stores the traffic classes and corresponding data (matching rules, policies, and partition pointers) related to each traffic class in a hierarchical tree. This tree is organized to show parent-child relationships—that is, a particular traffic class may have one or more subordinate child traffic classes with more specific characteristics (matching rules) than the parent class. In one embodiment, the root traffic classifications are "/inbound/" and "/outbound/" data flows. Any data flow not explicitly classified is classified as "/inbound/default/" or "/outbound/default/". In one embodiment, administrator interface 150 displays the traffic class tree and allows for selection of a traffic class and the configuration of a partition (dynamic or static) for that traffic class.

A.2. LRU List Module

As described above, LRU list module 138 maintains active flow LRU list and departed user LRU list. Both LRU lists contain links to user partition objects in partition object space 120 and last packet times associated with each user partition object. The order of the links in both LRU lists are determined by the time of the last packet associated with a corresponding user partition object traverses through data flow rate control device 30. LRU list module 138 receives these last packet transmission times and updates the appropriate LRU list as necessary. In addition, the active flow LRU list corresponds to users associated with active data flows, while the departed user LRU list corresponds to users associated with no active data flows. As discussed more fully below, data flow rate control device 30 monitors the number of active data flows associated with each user partition and moves the user partition between the active and departed user LRU lists as required. Other embodiments of the invention maintain a single LRU list for all user partition objects and employ another device, such as looking to the use count parameter (see below) for each user partition object, to distinguish between users having active flow and departed users for the processes described herein.

A.3. Partitions and the Partition Object Space

Partition objects define the various partitions enforced by flow control module 132. A partition operates to manage bandwidth for aggregate flows associated with a traffic class. A partition protects a network traffic class by guaranteeing a defined amount of bandwidth and/or limits a network traffic class by placing a cap on the amount of bandwidth a traffic class can consume.

A static partition manages bandwidth for all flows within a particular traffic class. Static partitions can be fixed or "burstable." A fixed partition allows a traffic class to use in the aggregate a defined amount of bandwidth. A fixed partition not only ensures that a specific amount of bandwidth will be available, but it also limits data flows associated with that traffic class to that same level. A burstable partition allows an aggregate traffic class to use a defined amount of bandwidth, and also allows that traffic class to access additional unused bandwidth, if needed. A cap may be placed on a burstable partition, allowing the traffic class to access up to a maximum amount of bandwidth, or the burstable partition may be allowed to potentially consume all available bandwidth across the access link. Partitions are arranged in a hierarchy—that is, partitions can contain partitions. For example, a static parent partition can be divided into multiple static child partitions. In one embodiment, at the highest level, a partition exists for all available outbound bandwidth, while another partition exists for all available inbound bandwidth across the particular access link. These partitions are then sub-dividable to form a hierarchical tree. For example, an enterprise employing static partitions may define a static partition for a PeopleSoft software application traffic class, and sub-divide this parent partition into a large burstable child partition for its human resources department and a smaller burstable child partition for the accounting department.

Dynamic and user partitions follow this same hierarchy. The partition object space 120 shown in FIG. 2 illustrates the hierarchical nature of partitions. A dynamic partition is essentially a static partition that partition management module 130 divides up on demand into user partitions (a partition that operates to apply bandwidth limits to individual users). A user partition, therefore, is a child of a dynamic partition. Like a static partition, a user partition may be fixed or burstable. In one embodiment, a static partition may be converted into a dynamic partition; however, only "leaf" static partitions (i.e., partitions having no child partitions) may be converted into dynamic partitions. Similarly, an overflow partition, discussed below, is a child of a dynamic partition. As discussed herein, an administrator has the option of limiting the number of user partitions corresponding to a parent dynamic partition. Alternatively, an administrator can opt not to include a cap and allow for oversubscription of the parent dynamic partition. In one embodiment, the user partition minimums are scaled back to avoid oversubscription of the parent partition. Further, an administrator can also choose to create an overflow partition for situations when a specified user cap is exceeded. When the cap is exceeded, any new data flows associated with the traffic class corresponding to the dynamic partition will be assigned to the overflow partition, which can be shared among one or more users until there is space under the user cap.

Partition object space 120 is a computer-readable medium, or an allocated portion thereof, allowing for storage, access to and modification of partition objects defining various static, dynamic, user and overflow partitions. In one embodiment, partition object space 120 is finite allowing for the storage of only a limited number of partition objects at any one time. In one embodiment, partition object space 120 resides in dynamic memory, such as RAM; however, partition object space 120 may be implemented in static or persistent memory such as an EPROM, or even a hard disk or other media.

A.3.a. Configuration of Partitions

As discussed above, a static partition is created by selecting a traffic class and configuring a partition for it. Configurable static partition parameters include 1) minimum partition size (in bits per second); 2) whether it is burstable (that is, when this option is selected, it allows the partition to use available excess bandwidth; when the option is not selected the partition has a fixed size); and 3) maximum bandwidth to be used when the partition bursts. In one embodiment, when a static partition is added, traffic classification database 137 stores a pointer to the partition object defining the static partition for the traffic class.

In one embodiment, a static partition is converted into a dynamic partition. Using administrator interface 150, an administrator selects a static partition corresponding to a traffic class and configures dynamic partition parameters that define how the dynamic partition is divided into user partitions. In one embodiment, the resulting data structure is a static partition object having static partition attributes and a pointer to an object defining the dynamic partition attributes. Of course, any suitable data structures and relationships can be implemented. In another embodiment, however, administrator interface 150 allows for the direct configuration of a dynamic partition. In addition, dynamic partition parameters can include: 1) minimum bandwidth for each user partition, 2) maximum bandwidth for each user partition (if it is burstable), 3) dynamic partition type (per-address/per-subnet); 4) side; 5) mask; 6) maximum number of users (user cap); 7) overflow partition maximum bandwidth, and 8) overflow partition minimum bandwidth. The parameters provided above are more fully described in association with the description of corresponding dynamic and user partition objects.

As with static partitions, the configuration of a dynamic partition results in the creation of a dynamic partition object. In one embodiment, a dynamic partition object includes the following data fields:

1) user partition minimum bandwidth—specifies the minimum bandwidth (bps) for each user partition;

2) user partition maximum bandwidth—specifies the maximum bandwidth (bps) for each user partition;

3) dynamic partition type (per-address/per-subnet)—a user may be defined by a single computer network address (e.g., IP address) or as a subnet;

4) mask—specifies the number of bits in the Classless Inter-Domain Routing (CIDR) mask (If the dynamic partition type is per-address, the mask is 32 bits. If the dynamic partition type is per-subnet, the administrator must specify the mask.);

5) side (inside/outside)—specifies the side (relative to data flow rate control device 30) on which the different IP address or subnets whose data flows generate user partitions will be found (see below);

6) user count—the value of this variable indicates the current number of child user partition objects of the parent dynamic partition in partition object space 120;

7) user cap—if selected, this parameter specifies the maximum number of user partition objects that can be created for a particular dynamic partition (any users exceeding the cap may be assigned to an overflow partition);

8) overflow partition minimum—specifies the minimum bandwidth (bps) for the overflow partition;

9) overflow partition maximum—specifies the maximum bandwidth (bps) for the overflow partition; and, 10) overflow partition pointer—points to the overflow partition object stored in partition object space 120 (note: an overflow partition, in one embodiment, is created upon creation of the dynamic partition and exists as a child of the parent dynamic partition).

FIG. 1 illustrates the concept of behind the "side" parameter above. Side is a parameter having one of two values relative to data flow rate control device 30: inside or outside. A particular network resource can either be "inside" or "outside" relative to data flow rate control device 30, while the user(s) of that resource are on the opposite side. The use of the side parameter allows for the creation of a user partition for each inside client device (e.g., client device 42) that connects to an outside host (e.g., server 28) or, alternatively, for each outside host (e.g., client device 24) accessing an inside host (e.g., server 44). For didactic purposes, assume that server 44 is an FTP server (a network resource for purposes of this example) and that users of that resource are at client devices 24. According to this example, the network resource to which data flow rate control device 30 controls and allocates access is "inside." Therefore, to configure a dynamic partition for outside users, the side parameter is set to "outside." As an additional example, assume that access link 21 is the network resource and that users at client devices 42 are the users of that resource. To configure dynamic partitions for access link, the side parameter is set to "inside." Lastly, the use of the side parameter, as described above, represents one of many possible embodiments. For example, if data flow rate control device 30 had three or more interfaces, then the user for which a partition is created can be determined in relation to the corresponding interface or a selected subset of the interfaces.

As described in more detail below, when a new user generates a data flow associated with a traffic class having a dynamic partition, a user partition object is created on demand for that user and stored in partition object space. In one embodiment, user partition objects include the following fields:

1) LRU link—provides a means for the user partition object to be associated with the appropriate LRU list;

2) IP address—specifies the IP address of the host or subnet corresponding to the user partition;

3) usecount—indicates the number of active data flows associated with the user partition; and 4) dynamic partition pointer—points to the parent dynamic partition object corresponding to the user partition object.

A.3.b. Creation of Partition Objects in Partition Object Space

Data flow rate control device 30 incorporates certain rules and techniques to compensate for the finite limits of partition object space 120. Specifically, when an administrator creates a static or dynamic partition, the corresponding object is created in partition object space 120. Likewise, user partition objects 166 are created in partition object space 120 on demand as users generate data flows that traverse data flow rate control device 30. However, as discussed above, partition object space 120 is finite, allowing for a limited number of partition objects for all partition object types (e.g., static, dynamic, user and overflow). In addition, according to one embodiment, a user partition object 166, once created, persists in partition object space 120 beyond the data flow(s) that prompted its creation. Consequently, use of data flow rate control device 30 eventually results in depletion of partition object space 120 for new partition objects.

Embodiments of the present invention, therefore, employ certain techniques and rules for bumping partition objects from partition object space 120. In one embodiment, there is no division or allocation of partition object space 120 for different types of partitions. In one form of this embodiment, static and dynamic partitions generally take precedence over user partition objects—that is, when an administrator configures a new static or dynamic partition object, partition management module 130 selects a user partition object in partition object space 120 for deletion to free up available space. In addition, overflow partitions (children of dynamic partitions) are created upon configuration of the dynamic partition and in a similar manner to the dynamic partition object. However, as described below, rules govern this selection to minimize the chance that a user partition object associated with a currently active user is deleted. Additionally, in one embodiment, partition object space 120 has a sequestered pool of partition objects (e.g., 3 to 5 partitions) reserved for the creation of static and dynamic partitions. Other rules and techniques are possible. In another embodiment, static/dynamic and user partitions each have a reserved pool of objects in partition object space 120.

Figure 8:
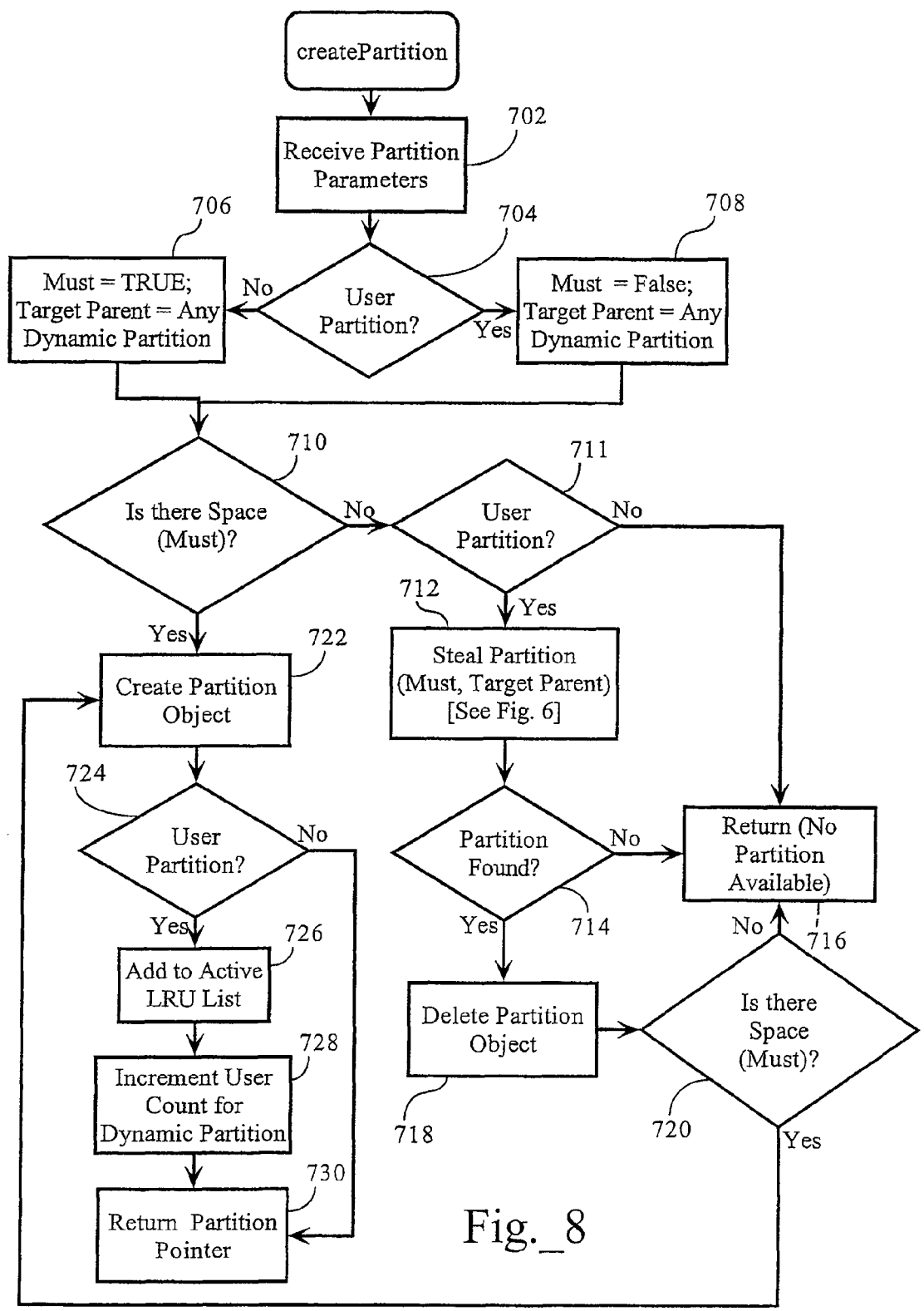
FIG. 8 is a flow chart describing a method for creating partition objects.

FIG. 8 illustrates a method allowing for the creation of partition objects. As discussed above, an administrator, using interface 150, can configure a static or dynamic partition with desired parameters (see above). In addition, partition management module 130 creates user partitions in response to data flows. In one embodiment, partition management module 130 receives partition parameters (step 702) and determines whether there is sufficient memory in partition object space 120 for a new partition object. In one embodiment, if the partition object to be created is a user partition object (step 704), the "must" value is set to FALSE and sets the Target Parent value used in the StealPartition method (see below) to any dynamic partition object (step 706). Otherwise, "must" is TRUE and the Target Parent is any dynamic partition object (step 708).

Partition management module 130 then tests whether there is sufficient space in partition object space 120 for creation of a new partition object (see step 710). To enforce the sequestered pool of objects in partition object space 120, partition management module 130, when must equals FALSE, skips over the reserved pool of objects when determining whether there is sufficient space in partition object space 120. However, when must equals TRUE (e.g., when creating a static or dynamic partition), partition management module 130 includes the reserved pool of objects in the determination.

If there is sufficient space, partition management module 130 creates the partition object (step 722) and returns a pointer to the partition object (step 730). If the partition is a user partition (step 724), partition management module 130 adds a link to the user partition object in the active flows LRU list (step 726) and increments the user count for the parent dynamic partition by one (step 728). If there is insufficient space and the partition to be created is a static, dynamic or overflow partition (i.e., even the sequestered pool of objects is depleted), partition management module 130 returns an error message, such as "No Partition Available" (step 716).

To associate a user partition object with a particular user, embodiments of the present invention use the computer network address (e.g., IP address) or the subnet corresponding to the user. As discussed in Section B., infra, flow control module 132 generates a flow specification object in response to a new data flow, including the inside and outside addresses associated with the data flow. The "side" parameter in the parent dynamic partition determines which address/subnet is used; that is—if the dynamic partition was created for inside users, the "inside" address is used and vice versa. The appropriate address is then stored in the corresponding user partition object. Beyond computer network addresses, users may be identified by any other suitable means, including RADIUS, Kerberos, ActiveDirectory, DHCP, etc.

If all available partition object space is depleted and the partition object to be created is user partition object (step 711), a partition object in partition object space 120 is bumped. Whether and how an existing partition object is bumped depends on the type of partition object (e.g., static, dynamic, overflow, or user). In one embodiment, static partition and dynamic partition objects take precedence over user partition objects—that is, partition management module 130 only selects user partition objects for deletion from partition object space 120. As to the selection of user partition objects, partition management module 130 invokes a method that scans the departed and active flow LRU lists for a user partition object associated with an inactive user, as more fully described below.

If there is insufficient memory in partition object space 120 and the partition object to be created is a user partition (step 711), partition management module 130 invokes the StealPartition method to find a user partition object of any parent dynamic partition corresponding to an inactive user (step 712) [see Section A.3.b.1., infra]. If the StealPartition method returns a pointer to a user partition object (step 714), partition management module 130 deletes the user partition object (step 718). Otherwise, partition management module 130 returns a "no partition available" error message (step 716).

Even though a user partition object may have been deleted, partition management module 130, in one embodiment, determines whether there is sufficient space in partition object space 120, as described above (see step 720). If deletion of a user partition object results in the creation of sufficient space, partition management module 130 creates the user partition object as discussed above (see steps 722 et seq.). Otherwise, partition management module 130 returns a "no partition available" error message (step 716).

Pursuant to the method described above, the pool of sequestered partition object is maintained essentially as a by-product of handling the requests for creation of user partition objects. For example, creation of a static partition in a previous iteration of the "CreatePartition" method may have resulted in the creation of a static partition object from the sequestered pool. Accordingly, when a user partition object is deleted in response to a request to create a new user partition object, the reclaimed object space may effectively become part of the sequestered pool, since the reclaimed partition object is bypassed in the determination of whether there is sufficient object space for the new user partition object. However, other methods can be employed to restore the sequestered pool. For example, partition management module 130, prior to or following the creation of a static, dynamic or overflow partition, can select (StealPartition method, below) and delete a user partition object.

A.3.b.1.) "Stealing" Partition Objects

Figure 6:
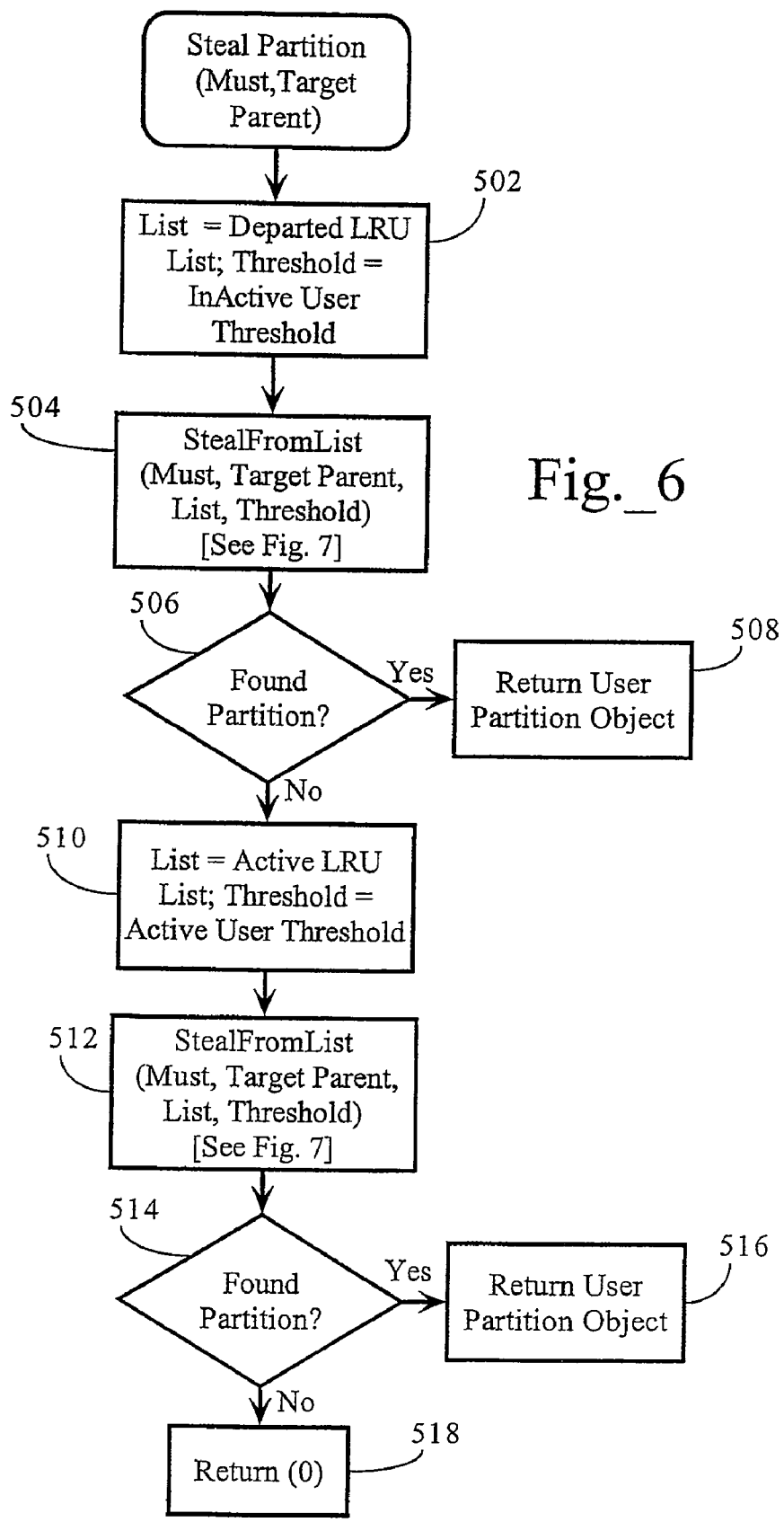
FIG. 6 is a flow chart providing a method allowing for selection of a user partition object corresponding to an inactive user.
Figure 7:
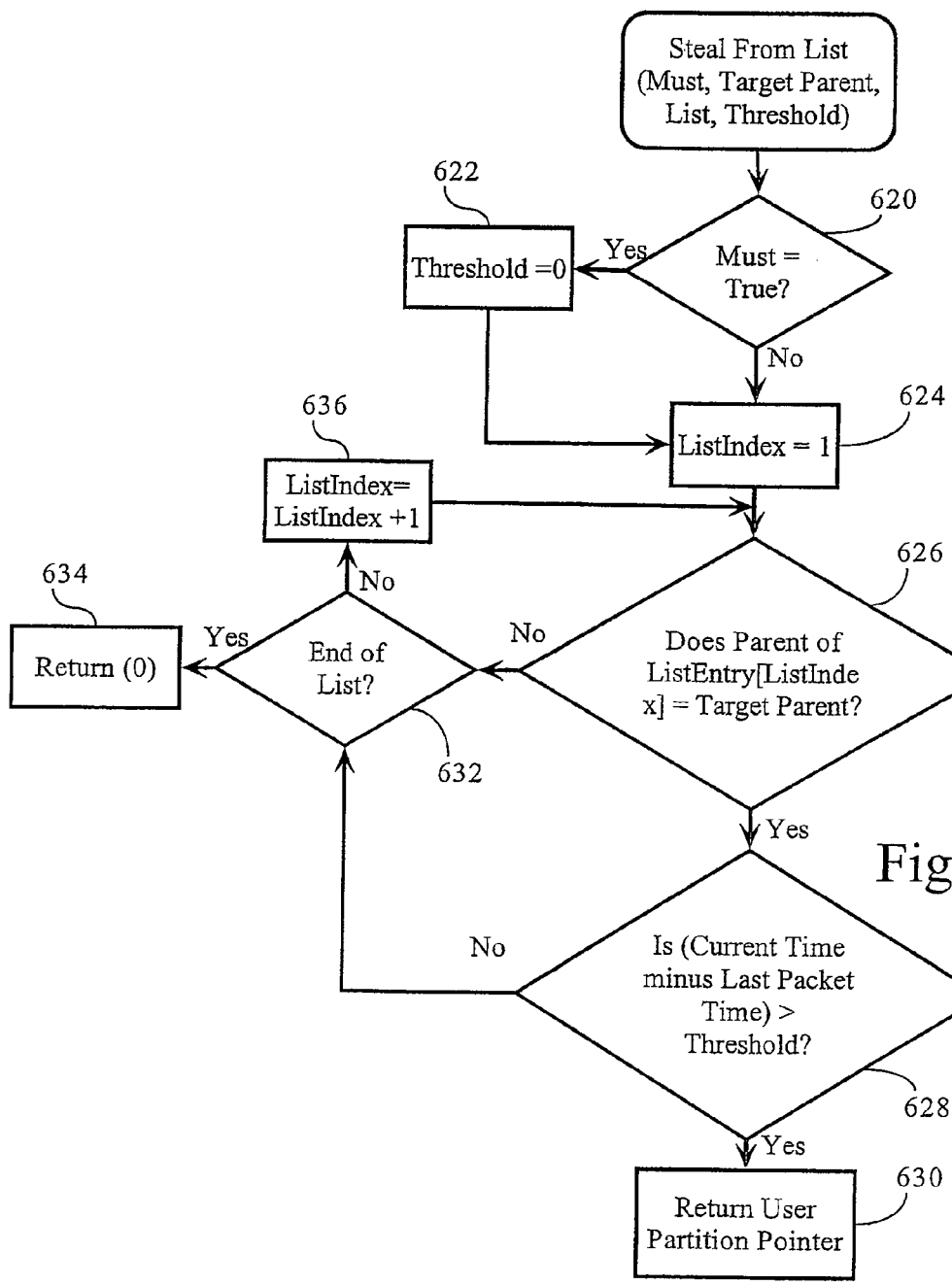
FIG. 7 is a flow chart setting forth a method allowing for selection of a user partition object corresponding to an inactive user.

FIGS. 6 and 7 illustrate methods allowing for selection of a user partition object corresponding to an inactive user based on a comparison of the last packet time to a threshold value. FIG. 7 illustrates a "StealFromList" method for searching an LRU list (e.g., active flow or departed user LRU list) for a user partition object that corresponds to a specified parent dynamic partition and where the last packet time associated with the user partition object exceeds a predetermined threshold. However, if the Target Parent is specified as "Any" or no value is provided, the StealFromList method scans all user partition objects in the LRU list. FIG. 6 illustrates a "StealPartition" method that invokes the "StealFromList" method to attempt to find an inactive user partition object from the departed user LRU list before resorting to the active flow LRU list. In addition, as FIG. 7 provides, these methods include a "must" boolean value that, when true, sets the threshold to zero (see FIG. 7, steps 620 and 622), which effectively causes the StealFromList method to choose the least recently used user partition object regardless of threshold.

The threshold values, which may be different for the departed and active flow LRU lists, represent a period of time after receipt of the last packet beyond which the user is deemed to be inactive. As discussed above, data flow rate control device 30 tracks data flows and maintains the number of active data flows associated with a user partition object. When there are no active data flows for a user partition object, the link to the object is deleted from the active flow LRU list and added to the departed user LRU list. However, presence on either list does not necessarily mean that the user corresponding to a user partition object is active or inactive. For example, during an interactive session involving many data flows between the network resource and the user, all data flows at any given point may be completed and, thus, the user partition object is linked to the departed user LRU list. Without a threshold determination, the user partition object may be deleted based on the order of the departed user LRU list, only to have to be replaced a short time thereafter. In addition, transmission or other network errors, as well as a user simply turning off the client device, may prevent one or more data flows from being closed out; however, the user partition object may remain on the active flow LRU list well after the user has terminated his or her session. Accordingly, embodiments of the present invention use a threshold time after the last packet time to evaluate whether a user partition object should be deleted. In one embodiment, the threshold for the active flow LRU list is 300 seconds (5 minutes), while the threshold for the departed user LRU list is 30 seconds. Configuration of these thresholds, however, are matters of engineering and design choice and may vary without departing from the scope of the invention.

More specifically, referring to FIG. 7, starting with the first user partition object in the LRU list [i.e., the least recently used user partition object based on last packet time] (step 624), the StealFromList method determines whether the parent dynamic partition equals the specified target dynamic partition, if any (step 626). If so, the StealFromList method compares the last packet time to the specified threshold value (step 626). In one embodiment, the threshold value is subtracted from the current time to allow for a direct comparison with the last packet time. If the last packet time exceeds the threshold, the StealFromList method returns a pointer to the user partition object (step 630). Otherwise, the StealFromList method runs through the entire LRU list (see steps 632 and 636). If no user partition object is selected, the StealFromList method returns a zero or some other appropriate value (step 634). As discussed above, FIG. 6 illustrates a "StealPartition" method that invokes the "StealFromList" method to attempt to find an inactive user partition object from the departed user LRU list (see steps 502, 504, 506 and 508) before resorting to the active flow LRU list (see steps 510, 512, 514 and 516). If no user partition object is found, the StealPartition method returns a zero or other appropriate value (step 518).

Furthermore, FIG. 5A illustrates a "ReleasePartition" method that invokes the StealPartition and, thus, the StealFromList methods to delete a user partition object corresponding to a particular parent dynamic partition. In one embodiment, the ReleasePartition method is used to attempt to free up space under a cap placed on the number of user partitions that can be created for a particular dynamic partition (see Section B.1.a., infra). The ReleasePartition method sets must to false and the target parent to the appropriate dynamic partition object pointer (step 440) and passes these parameters to the StealPartition method (step 442). As discussed above, the StealPartition method operates to return a pointer to a user partition object, if any, corresponding to specified parent dynamic partition and associated with an inactive user. If a child user partition object is found (step 444), the ReleasePartition method deletes the user partition object (step 446) and returns (step 448).

A.3.b.2.) Deleting User and Dynamic Partition Objects

Given the various associations among dynamic partition objects, user partitions objects, and the LRU lists, deletion of user and dynamic partitions from partition object space 120 should be handled accordingly. To delete a user partition object, partition management module 130 deletes the user partition object from partition object space 120 and deletes the link to that object in LRU list module 138. In addition, partition management module 130 also decreases the user count parameter in the parent dynamic partition by one. To delete a dynamic partition entirely or to convert it to a static partition, partition management module 130 deletes all children of the dynamic partition (user partition objects), as described above, and then deletes the dynamic partition object.

A.3.b.3.) Alternative Embodiment

The methods described above for managing partition object space 120 and reclaiming partition objects for subsequent users represent one of many possible implementations each having various advantages and disadvantages. In another embodiment, partition management module 130 periodically deletes user partition objects associated with inactive users, rather than deleting user partition objects only when necessary. In yet another embodiment, user partition objects are deleted once all data flows have closed out. In one embodiment, a background daemon monitors partition object space 120 and operates to reclaim the object space taken up by inactive user partition objects. Accordingly, a request for a user partition either returns an available user partition object, an overflow partition, or the dynamic partition without invoking methods that attempt to bump inactive user objects.

A.4. Measurement Engine

Measurement engine 140 periodically samples and logs usage data associated with the operation of data flow rate control device 30. For example, measurement engine 140 records the number of packets traversing data flow rate control device 30. As to partitions, measurement engine records such usage data as: 1) the number of times a user cap was reached for a dynamic partition; 2) the number of times an overflow partition was used; 3) the number of times partition object space 120 was entirely depleted; 4) the peak number of active users in each partition; and 5) the number of currently active users during an analysis interval. As one skilled in the art will recognize, the various software modules described herein include functionality that allows for the acquisition of such usage data, such as incrementing counters relating to various usage parameters.

Recording the number of active users, however, deserves some mention. As discussed in section A.3.b.1., supra, an active user may or may not have any active flows at a given point in time. Therefore, an active user is determined by the time of the last packet corresponding to that user in relation to a threshold value. Accordingly, to record the number of active users at any given time, measurement engine 140 scans the active flow and departed user LRU lists against pre-determined threshold values to determine the number of currently active users.

B. Operation

Figure 3:
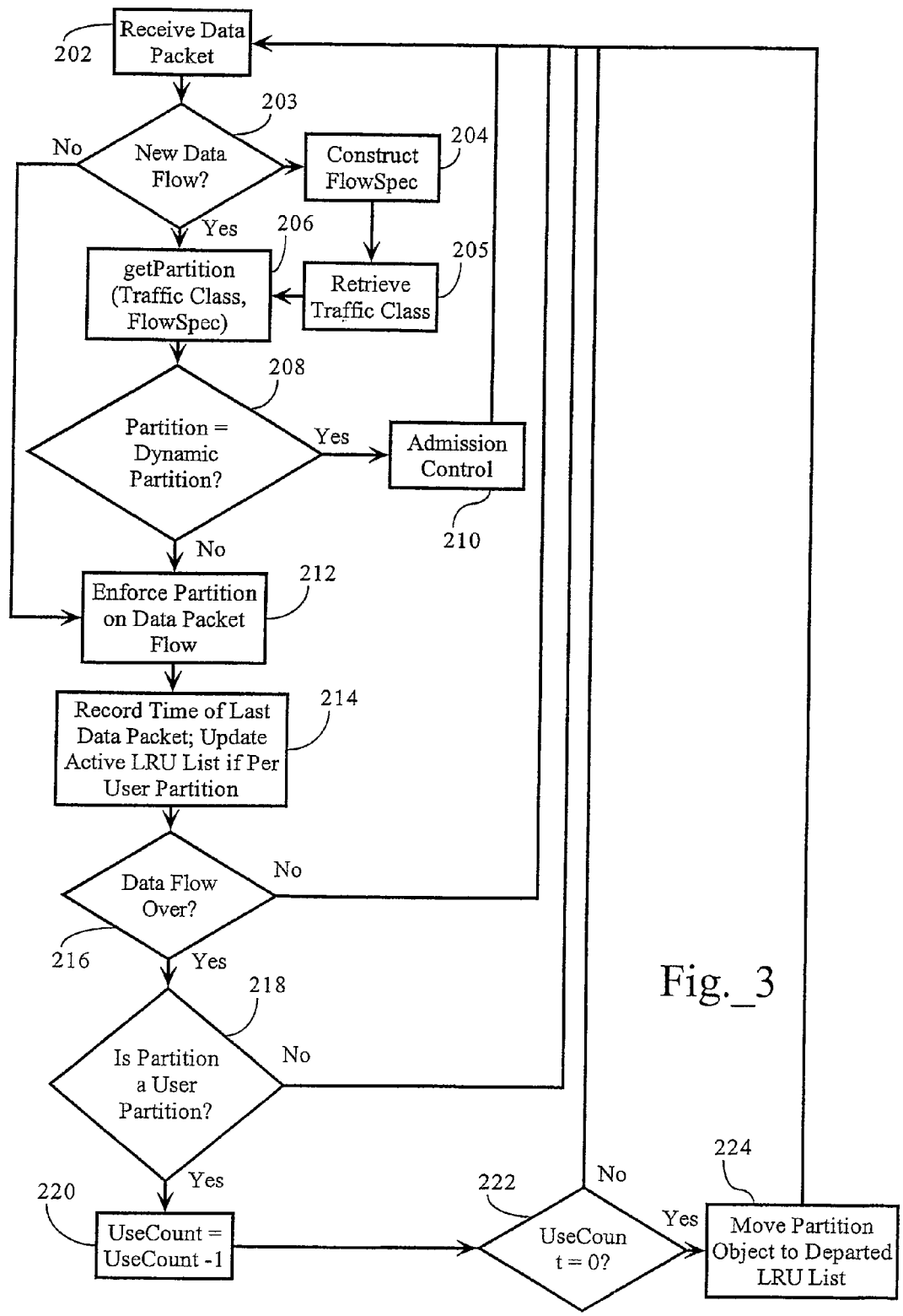
FIG. 3 is a flow chart providing a method allowing for enforcement of partitions on network data flows.

FIG. 3 illustrates a method facilitating the enforcement of partitions on data flows transmitted across data flow rate control device 30. In one embodiment, rate control module 132 receives a data packet (FIG. 3, step 202) and determines whether it is part of a new data flow (step 203). Methods for determining new data flows and assigning packets to existing data flows are well known in the art and also depend on the particular transport layer protocol employed. If the packet is a new data flow, rate control module 132 constructs a flow specification object (FlowSpec) including attributes characterizing the data flow (step 204). In one embodiment, a flow specification object includes an "inside" and "outside" address relative to data flow rate control device 30 (see Section A.3.a., above). For a TCP packet, rate control module 132 can compute the inside and outside addresses based on the source and destination addresses of the packet and the direction of the packet flow. Other flow specification attributes can include port number, service type, protocol, etc. Rate control module 132 then retrieves the traffic class associated with the data flow (see Section A.1., above) (step 205). Rate control module 132 then calls partition management module 130 to return a partition associated with the data flow (step 206). In one form, rate control module 132 passes a traffic class pointer and flow specification pointer to partition management module 130. Partition management module 130 returns a partition object pointer as more fully described below (see FIG. 4).

According to one embodiment, partition management module 130 can return a pointer to a static partition, a dynamic partition, a user partition, or an overflow partition. If the returned partition is a dynamic partition (step 208), flow control module 132 applies admission control on the data flow (step 210). For example, in the UDP transport layer protocol, flow control module 132 can merely drop the packets. Alternatively, for the TCP protocol, flow control module 132 can transmit a RESET packet to the TCP transmitter. Flow control module 132 may also return an HTTP error message, such as a 504—Out of Bandwidth Error. As one skilled in the art will recognize, admission control will depend on the protocols employed. As discussed in more detail below, an alternative to admission control is allocating the data flow to an overflow partition.

With the appropriate partition, flow control module 132 then enforces the partition on the data packet flow (step 212). To allow for maintenance of the LRU lists, the time of the packet is recorded and used by LRU list module 138 to update the active flow LRU list if the partition is a user partition (step 214). If the packet represents the end of a data flow (e.g., a FIN packet for the TCP protocol) (step 216) and the partition is a user partition (step 218), the parameters relating to the number of active data flows corresponding to that user partition are adjusted. As discussed above, each user partition object includes a usecount indicating the number of active data flows. At the end of a data flow, the usecount associated with the user partition is adjusted accordingly (step 220). A resulting usecount value of zero (0) indicates that there are no currently active flows for the user partition and results movement of the user partition from the active flow LRU list to the departed user LRU list (see steps 220 and 224).

B.1. Getting Static and Dynamic Partitions

FIG. 4 provides a method for retrieving a partition corresponding to a data flow. As discussed above, flow control module 132, in response to a new data flow, requests a partition from partition management module 130, passing the traffic class object pointer and a flow specification object pointer. Partition management module 130 accesses traffic classification database 137 to fetch a partition, if any, corresponding to the traffic class (step 302). If the partition is not a dynamic partition (see step 304) and, thus, a static partition, partition management module 130 returns a pointer to the static partition object 162 in partition object space 120. Otherwise, if the partition associated with the traffic class is a dynamic partition (step 304), partition management module 130 then calls a function within partition management module 130 associated with user partitions (step 308), as more fully described below, and returns a pointer to a partition object (step 310). See FIG. 5.

B.1.a. GetUserPartition Function

Figure 5:
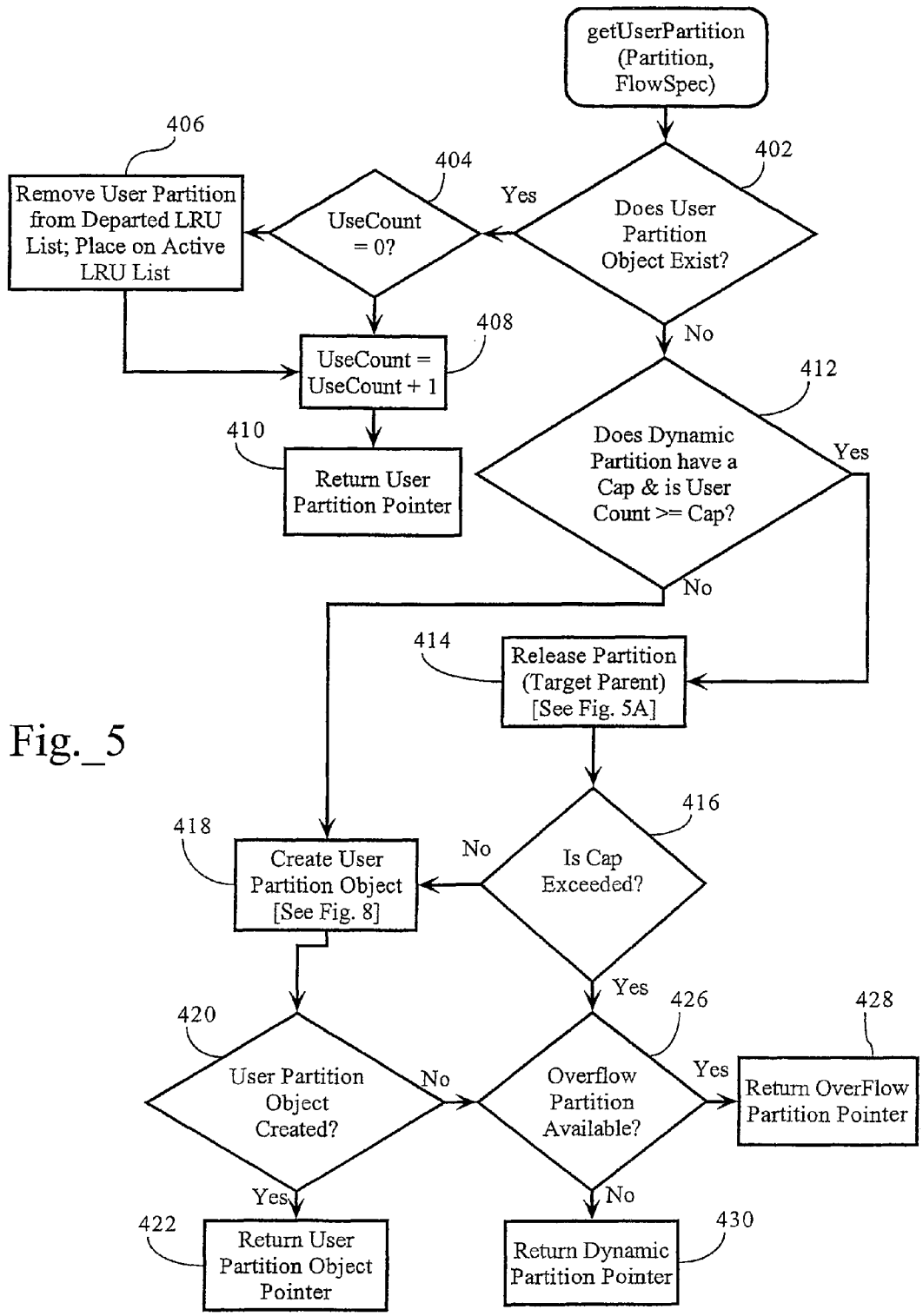
FIG. 5 is a flow chart illustrating a method that processes a request for a user partition and returns a partition object pointer.

FIGS. 5 and 5A illustrate a method for processing a request for a user partition. As the flow chart diagrams illustrate, partition management module 130, in one embodiment, can return a pointer to one of three different types of partition objects: a user partition object, the dynamic partition itself (as a message that a user partition cannot be created at that time), or an overflow partition (if the dynamic partition is configured to include a user cap and an overflow partition). In one embodiment, the GetUserPartition function is passed pointers to a dynamic partition object and a flow specification object. The GetUserPartition method looks down a list of the child user partitions of the dynamic partition (step 402). Specifically, based on the value of the "side" parameter in the dynamic partition object, the GetUserPartition method selects the appropriate address from the flow specification object that includes the "inside" and "outside" computer network addresses. For example, if the side parameter is set to "inside," the GetUserPartition method selects the inside address in the flow specification object, and vice versa. The GetUserPartition method then uses this address, including the mask value in the dynamic partition object, to identify a child (user partition object) of the dynamic partition object with a matching network address or subnet.

If a user partition object 166 exists in partition object space 120, the GetUserPartition method determines whether there are any active data flows associated with the user partition object (in one embodiment, by checking the value of the "usecount" parameter) (see step 404). If the usecount value equals 0 (i.e., that no active flows exist for the user partition), the user partition is deleted from the departed user LRU list and added to the active flow LRU list (step 406). Regardless of to which LRU list the user partition object is linked, the usecount for the user partition is also incremented by one in light of the new data flow (step 408). The GetUserPartition method then returns a pointer to the user partition object (step 410) for use by flow control module 132.

If a user partition object does not exist in partition object space 120, the GetUserPartition method determines whether such a user partition object can be created based on explicit limitations configured by an administrator (e.g., user caps) and/or inherent limitations due to the finite limits of partition object space 120. As FIG. 5 illustrates, in one embodiment, the GetUserPartition method determines whether a user cap has been configured for the dynamic partition and whether that cap is exceeded (step 412). In one form, the user count value in the dynamic partition object (which is continuously updated as user object partitions enter and exit partition object space 120) is compared to the user cap value associated with the dynamic partition. If the cap is exceeded, the GetUserPartition method invokes the "ReleasePartition" method (see FIG. 5A) to attempt to delete a child user partition associated with an inactive user. See Section A.3.b.1., supra. If the user cap is still exceeded (step 416), the GetUserPartition method determines whether an overflow partition has been configured (step 426) and, if so, returns a pointer to the overflow partition (step 428). Otherwise, the GetUserPartition method returns the pointer to the dynamic partition itself, which in one embodiment, signals flow control module 132 to execute admission control functionality using bandwidth allocated to the dynamic partition (step 430).

The ReleasePartition method may result in the deletion of a user object partition and, therefore, a decrease in the user count associated with the parent dynamic partition. However, in certain embodiments, deletion of a user partition object may not be completed at the time of the cap determination in step 416. Accordingly, the current data flow is passed to the overflow partition, if any, or admission control. In this instance, the ReleasePartition method frees up, if possible, space under the cap for subsequent data flows associated with the dynamic partition and, typically, associated with the same user as a typical session involves multiple data flows.

Lastly, if the user count value does not exceed the user cap associated with the dynamic partition, the GetUserPartition method passes the user partition parameters to another method that creates the user partition object, if possible [see FIG. 8 and Section A.3.b., supra] (step 418). If the user partition object is created (step 420), the GetUserPartition function returns a pointer to the user partition object (step 422). Flow control module 132 then enforces the partition on the data flow.

B.1.b. Alternative Embodiments

One embodiment of the present invention takes advantage of existing rate control functionality supported by routers (e.g., CISCO® 7200 Series router), such as Committed Access Rate (CAR) and Class-Based Weighted Fair Queue-ing (CBWFQ). For example, data flow rate control device 30 identifies new users in data flows traversing it as described above and adjusts partition object space 120 accordingly. However, instead of directly controlling the rate of the data flow, data flow rate control device 30 modifies the policy configuration of router 22 to enforce the partition. Data flow rate control device 30, in one embodiment, accesses the administrative interface of router 22 to modify policy configuration. To take advantage of CAR functionality, for instance, data flow rate control device 30 configures an access control list including the new user and an associated rate policy according to the parameters set forth in the parent dynamic partition. Alternatively, to utilize CBWFQ partitioning functionality, data flow rate control device 30 configures an access control list including the new user as a matching criterion for a class map and associates a rate policy according to the parameters (e.g., bandwidth and queue limiting settings) set forth in a parent dynamic partition. According to either embodiment, router 22 enforces the partition implemented by CAR or CBWFQ on subsequent data flows. In one embodiment, when the user is inactive (see Sections A.3.b.1. & 3.), data flow rate control device 30 modifies the policy configuration of router 22 to delete the access control list or the class map associated with the inactive user. Moreover, data flow rate control device 30, apart from managing partition object space 120, monitors any limitations on the number of access control lists that router 22 may support.

C. Illustrative Applications

The present invention can be applied to a wide variety of computer network environments to achieve a vast array of objectives. FIG. 9 illustrates an application of one embodiment of the present invention to the operations of an Internet Services Provider (ISP) 70 whose subscribers connect to it using client devices 24 including, for example, cable modems. In one embodiment, ISP 70 includes cable head end units 62 operably connected to data flow rate control device 30. ISP 70 provides connectivity to Wide Area Network (WAN) 50 by any suitable means.

For example, an ISP may have 20,000 subscribers, with up to 2,000 subscribers logged on at any given time. In one embodiment, data flow rate control device 30 can dynamically allocate user partitions as each subscriber logs on providing a minimum and maximum amount of bandwidth to each user. As discussed above, to accommodate new users when the maximum number of user partition objects is reached, data flow rate control device 30 removes the least-recently-used and inactive user partition objects in order to release bandwidth to new users.

Referring to FIG. 1, an administrator of computer network 40 could also configure data flow rate control device 30 to dynamically partition available bandwidth to outside users of server 44. For didactic purposes, assume that server 44 is an FTP server having a computer network address labeled "ftp.acme.com" and including several files available for download by users at client devices 24. Given that the inbound data flows to server 44 are not likely to be significant, the administrator may configure a traffic class, such as "/Outbound/FTP/ftp.acme.com/", and a dynamic partition for this traffic class. However, the administrator may also create a partition for inbound traffic to server 44 as well. Since the users of this network resource are "outside" relative to data flow rate control device 30, the administrator sets the "side" parameter to "outside." Accordingly, data flow rate control device 30 dynamically allocates user partitions as outside users access server 44. Additionally, to ensure an adequate download speed for each user, the administrator may configure a user cap to limit the number of concurrent users and an overflow parameter to prevent oversubscription of the /Outbound/FTP/ftp.acme.com/ partition.

Data flow rate control device 30 may also be deployed to manage available bandwidth for access link 21 to inside users. For example, an administrator may configure data flow rate control device 30 to partition bandwidth across access link 21 among three groups of users and within each partition for each user group dynamically create user partitions as users generate data flows. FIG. 10 illustrates a didactic partition configuration. Assume that the available bandwidth across access link 21 is 1.5 Mbps. Using administrator interface 150, an administrator can configure three partitions as children of the root /Inbound/ partition 90. For example, an administrator may allocate a minimum of 512 Kbps to /Inbound/Marketing/ partition 92, a minimum of 256 Kbps to /Inbound/Warehouse/ partition 93, and a minimum of 768 Kbps to /Inbound/Engineering/ partition 91. The root /Outbound/ partition can also be configured in a similar manner. Alternatively, an administrator may configure burstable partitions having a minimum and a maximum allocated bandwidth (see above). As to any or all of partitions 91, 92 and 93, the administrator may configure them as dynamic partitions and provide the parameters for the user partitions 95 that are dynamically created in response to data flows. Of course, as discussed above, a variety of configurations are possible, including the use of user caps and overflow partitions.

Lastly, although the present invention has been described as operating in connection with end systems employing the TCP and IP protocols, the present invention has application in computer network environments employing any suitable transport layer and network layer protocols. Moreover, while the embodiments described above operate primarily to dynamically allocate bandwidth among a plurality of users, the present invention can be applied to dynamically allocate access to a wide variety of network resources, such as a bank of modems, or a pool of processors or wireless radio frequencies. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. A method, comprising:
   receiving, at a network device, a packet of a data flow between a first host and a second host;
   determining, relative to the network device, which of the first and second hosts is an inside host and which of the first and second hosts is an outside host;
   accessing a memory space comprising a plurality of partition objects, wherein the plurality of partition objects includes one or more dynamic partition objects, each one of the one or more dynamic partition objects having at least one attribute defining a first allocation of network bandwidth across all data flows associated with the one of the one or more dynamic partition objects and a side parameter indicating which of the inside and outside host is a user, and a second attribute defining user partition allocations of the network bandwidth within the first allocation;
   selecting a partition object from the plurality of partition objects based on one or more attributes of the data flow; and
   if the selected partition object is a dynamic partition object,
   identifying either the first or second host as a user based on the side parameter of the selected dynamic partition object;
   creating, if no user partition object exists for the identified user, a user partition object as a child of the selected dynamic partition object in the memory space for the identified user, wherein the user partition object is accessible by a data flow control mechanism to allocate utilization of the network bandwidth within the first allocation, according to the second attribute defined in the selected dynamic partition object, across all data flows associated to the selected dynamic partition object and the identified user.

2. The method of claim 1 wherein the determining, relative to the network device, which of the first and second hosts is an inside host and which of the first and second hosts is an outside host is based on source and destination addresses of the packet and a direction of the packet flow.

3. The method of claim 1 wherein the user partition object is configurable based on a characteristic of the identified user's utilization of the network bandwidth.

4. The method of claim 1 wherein the user partition object is operable to provide a minimum allocation of the network bandwidth to the identified user.

5. The method of claim 1 wherein the user partition object is operable to limit utilization of the network bandwidth.

6. The method of claim 1 further comprising
   accessing a traffic class database storing a plurality of traffic class definitions;
   matching the data flow to a traffic class definition of the plurality of traffic class definitions; and wherein the partition object is selected based on the traffic class definition to which the data flow is matched.

7. The method of claim 6 wherein the first host is an inside server operative to establish data flows corresponding to a first traffic class definition of the plurality of traffic class definitions, and wherein a first dynamic partition object of the one or more dynamic partition objects is configured to correspond to the first traffic class definition and the side parameter of the first dynamic partition object is set to identify inside hosts as users.

8. The method of claim 1 further comprising deleting inactive user partition objects from the partition object space.

9. The method of claim 8 wherein an inactive user partition object is identified in relation to a threshold period of inactivity.

10. The method of claim 1 further comprising reclaiming inactive user partition objects from the partition object space as required for new users.

11. The method of claim 10 wherein an inactive user partition object is identified in relation to a threshold period of inactivity.

12. A method, comprising:
    receiving, at an interface of a plurality of interfaces of a network device, a packet of a data flow between a first host and a second host;
    accessing a memory space comprising a plurality of partition objects, wherein the plurality of partition objects includes a dynamic partition object having at least one attribute defining a first allocation of network bandwidth across all data flows associated with the dynamic partition object and a parameter identifying an interface of the plurality of interfaces, and a second attribute defining user partition allocations of the network bandwidth within the first allocation;

selecting a partition object from the plurality of partition objects based on one or more attributes of the data flow; and if the selected partition object is the dynamic partition object,
- identifying either the first or second host as a user based on the interface identified in the parameter and the respective relationships between the interface identified in the parameter and the first and second hosts;
- creating, if no user partition object exists for the identified user, a user partition object as a child of the selected dynamic partition object in the memory space for the identified user, wherein the user partition object is accessible by a data flow control mechanism to allocate utilization of the network bandwidth within the first allocation, according to the second attribute defined in the selected dynamic partition object, across all data flows associated to the selected dynamic partition object and the identified user.

13. The method of claim 12 wherein the identifying either the first or second host as a user is further based on source and destination addresses of the packet and a direction of the packet flow.

14. The method of claim 12 wherein the user partition object is configurable based on a characteristic of the identified user's utilization of the network bandwidth.

15. The method of claim 12 wherein the user partition object is operable to provide a minimum allocation of the network bandwidth to the identified user.

16. The method of claim 12 wherein the user partition object is operable to limit utilization of the network bandwidth.

17. The method of claim 12 further comprising
accessing a traffic class database storing a plurality of traffic class definitions;
matching the data flow to a traffic class definition of the plurality of traffic class definitions; and wherein the partition object is selected based on the traffic class definition to which the data flow is matched.

18. The method of claim 17 wherein the first host is server corresponding to a first interface operative to establish data flows corresponding to a first traffic class definition of the plurality of traffic class definitions, and wherein a first dynamic partition object of the one or more dynamic partition objects is configured to correspond to the first traffic class definition and the parameter of the first dynamic partition object is set to identify hosts associated with the first interface as users.

19. The method of claim 12 further comprising deleting inactive user partition objects from the partition object space.

20. The method of claim 19 wherein an inactive user partition object is identified in relation to a threshold period of inactivity.

21. The method of claim 12 further comprising reclaiming inactive user partition objects from the partition object space as required for new users.

22. The method of claim 21 wherein an inactive user partition object is identified in relation to a threshold period of inactivity.

23. A method, comprising:
- recognizing a new user of network bandwidth based on one or more attributes of at least one packet in a data flow;
- accessing a memory space comprising a plurality of partition objects including a dynamic partition object having at least one attribute defining a first allocation of the network bandwidth across all data flows corresponding to the dynamic partition object, and a second attribute defining user partition allocations of the network bandwidth within the first allocation;
- selecting a partition object from the plurality of partition objects based on one or more attributes of the data flow; and
- if the selected partition object is the dynamic partition object, creating a user partition object as a child of the dynamic partition object on demand for the new user, wherein the user partition object is operable to allocate utilization of the network bandwidth, according to the second attribute defined in the dynamic partition object, across all data flows corresponding to the new user; and,
- reclaiming the user partition object after it becomes inactive.

* * * * *